(12) United States Patent
Schroeder

(10) Patent No.: US 11,122,203 B1
(45) Date of Patent: Sep. 14, 2021

(54) REFRIGERATOR CAMERA MODULES AND METHODS FOR PREVENTING LENS FOG

(71) Applicant: Haier US Appliance Solutions, Inc., Wilmington, DE (US)

(72) Inventor: Michael Goodman Schroeder, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/882,820

(22) Filed: May 26, 2020

(51) Int. Cl.
| | |
|---|---|
| H04N 5/232 | (2006.01) |
| H04N 5/77 | (2006.01) |
| H04N 5/225 | (2006.01) |
| F25D 21/04 | (2006.01) |
| F25D 29/00 | (2006.01) |
| F25D 23/02 | (2006.01) |
| H04N 7/18 | (2006.01) |

(52) U.S. Cl.
CPC ......... *H04N 5/23245* (2013.01); *F25D 21/04* (2013.01); *F25D 23/028* (2013.01); *F25D 29/005* (2013.01); *H04N 5/2253* (2013.01); *H04N 5/77* (2013.01); *H04N 7/18* (2013.01)

(58) Field of Classification Search
CPC .... G06K 9/52; G06K 9/4652; G06K 9/00335; G06K 9/6201; G06T 7/60; G06T 7/73; G06T 7/20; G06T 7/90; G06T 7/254; G06T 7/11; G06T 7/246; G06T 7/33; G03B 29/00; F25D 29/005; F25D 27/00; F25D 23/028; F25D 23/00; F25D 23/12; F25D 29/00; F25D 23/062; F25D 23/04; F25D 23/067; F25D 23/02; F25D 11/00; F25D 25/025; H04N 5/22521; H04N 5/2621; H04N 5/2257; H04N 5/232939; H04N 5/23293; H04N 5/2624; H04N 5/2253; H04N 7/18; H04N 5/2252; H04N 5/2254; G02B 27/0006
See application file for complete search history.

(56) References Cited

U.S. PATENT DOCUMENTS

| | | | |
|---|---|---|---|
| 10,228,187 B2 | 3/2019 | Hong | |
| 10,365,671 B1 | 7/2019 | Arnold | |
| 2012/0314710 A1* | 12/2012 | Shikano | ............... H04L 47/122 370/392 |
| 2016/0047587 A1* | 2/2016 | Sasaki | .................... H04N 7/183 239/71 |
| 2016/0138859 A1 | 5/2016 | Schramm | |
| 2016/0182864 A1* | 6/2016 | Izawa | ................. H04N 5/2256 348/159 |
| 2016/0210510 A1* | 7/2016 | Wait | .................... G06K 9/6202 |

(Continued)

*Primary Examiner* — Neil R Mikeska
(74) *Attorney, Agent, or Firm* — Dority & Manning, P.A.

(57) ABSTRACT

Refrigerator appliances and methods, as provided herein, may include a cabinet, a door, a camera module, and a controller. The cabinet may define a chilled chamber. The door may be rotatably hinged to the cabinet to provide selective access to the chilled chamber. The camera module may be mounted to the cabinet within the chilled chamber. The controller may be operably coupled to the camera module. The controller may be configured to initiate an operation routine including initiating a continuous anti-fog capture sequence at the camera module, receiving a static image signal from the camera module during the continuous anti-fog capture sequence, or discarding the received static image signal.

18 Claims, 5 Drawing Sheets

(56) References Cited

U.S. PATENT DOCUMENTS

| | | | | |
|---|---|---|---|---|
| 2016/0217417 A1* | 7/2016 | Ma | .......................... | H04N 5/225 |
| 2017/0359423 A1* | 12/2017 | Nadathur | .............. | H04L 67/146 |
| 2021/0049775 A1* | 2/2021 | Ryu | ................... | G06K 9/00355 |

* cited by examiner

REFRIGERATOR CAMERA MODULES AND METHODS FOR PREVENTING LENS FOG

FIELD OF THE INVENTION

The present subject matter relates generally to systems and methods for preventing fog from obscuring a line of sight of a camera, particularly for a camera in a refrigerator appliance.

BACKGROUND OF THE INVENTION

Storage enclosures, such as refrigerator appliances and pantries, generally provide an enclosed chamber for receiving multiple items or objects. For example, refrigerator appliances generally include a cabinet that defines a chilled chamber. A user can place food items or objects within the chilled chamber in order to hinder perishing of such food items. Thereby, a useable life of perishable items or objects can be increased.

Over time, a large volume or number of stored items (e.g., food items) can accumulate within the refrigerator's chilled chamber. As stored items accumulate, users of the refrigerator appliance can have difficulty identifying the items located within the refrigerator appliance. Additionally, users can have difficulty determining a quantity of certain items within the refrigerator appliance. This is especially true when multiple users add/remove items from a common refrigerator appliance without communicating with other users. Consequently, the users may accidentally purchase excessive or undesired items. For example, certain food items do not readily perish within the chilled chamber, and such food items may be consumed infrequently. Thus, such food items can remain within the chilled chamber for extended periods of time. The users can forget about such food items and purchase replacements despite already having acceptable items. In such a manner, the users can be inconvenienced or spend money needlessly. Additionally or alternatively, some users may be unaware that certain items have been removed or consumed. Thus, users may fail to replace or replenish such items.

Existing systems have attempted to address these issues by providing a camera within the chilled chamber of the refrigerator appliance (e.g., to view or track the contents of the chilled chamber). Nonetheless, use of a camera within a chilled chamber creates additional issues. In particular, rapid changes in air temperature or moisture content (e.g., caused by the opening/closing of a door) can result in condensation (i.e., fog) accumulating on surfaces of the chilled chamber. For instance, moisture may condensate on a lens of the camera module, blocking or otherwise obscuring the camera's line of sight and generally degrading performance.

Accordingly, a method or refrigerator appliance having features for preventing condensation or fog from accumulating along a line of sight of a camera would be useful.

BRIEF DESCRIPTION OF THE INVENTION

Aspects and advantages of the invention will be set forth in part in the following description, or may be obvious from the description, or may be learned through practice of the invention.

In another exemplary aspect of the present disclosure, a refrigerator appliance is provided. The refrigerator appliance may include a cabinet, a door, a camera module, and a controller. The cabinet may define a chilled chamber. The door may be rotatably hinged to the cabinet to provide selective access to the chilled chamber. The camera module may be mounted to the cabinet within the chilled chamber. The controller may be operably coupled to the camera module. The controller may be configured to initiate an operation routine including initiating a continuous anti-fog capture sequence at the camera module, receiving a static image signal from the camera module during the continuous anti-fog capture sequence, or discarding the received static image signal.

In another exemplary aspect of the present disclosure, a method of operating a refrigerator appliance is provided. The method may include initiating a continuous anti-fog capture sequence at the camera module. The method may further include receiving a static image signal from the camera module during the continuous anti-fog capture sequence. The method may still further include discarding the received static image signal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
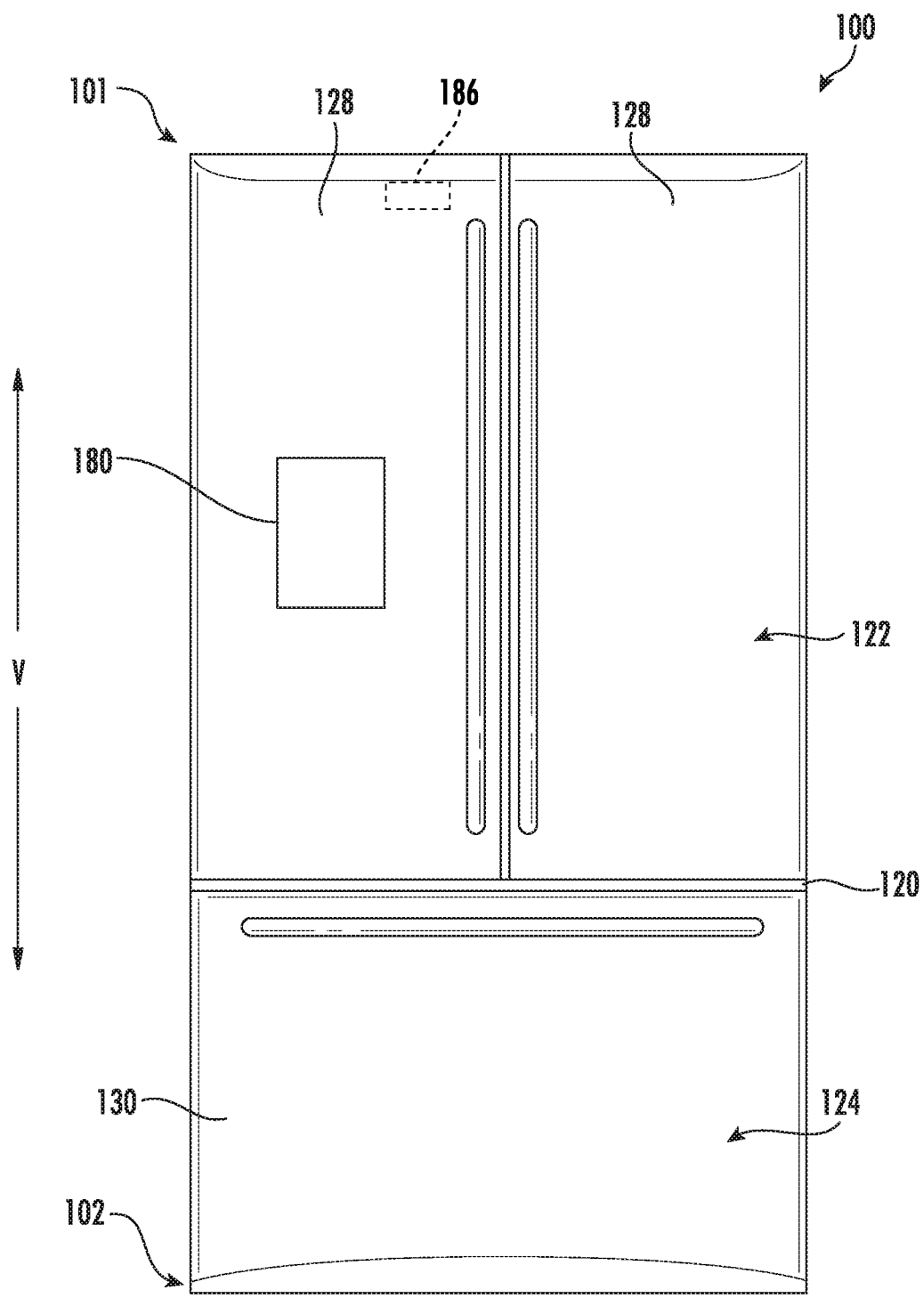
FIG. 1 provides a front elevation view of a refrigerator appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. Furthermore, as used herein, terms of approximation, such as "approximately," "substantially," or "about," refer to being within a ten percent margin of error.

Generally, the present disclosure provides systems and methods to generate heat at a camera module in a low-temperature environment, such as a refrigerator chilled chamber, which may be sufficient to prevent the accumulation of condensation that might otherwise obscure the camera. The systems and methods may generate such heat without needing or using a dedicated heating element, such as a resistance heating element.

Figure 2:
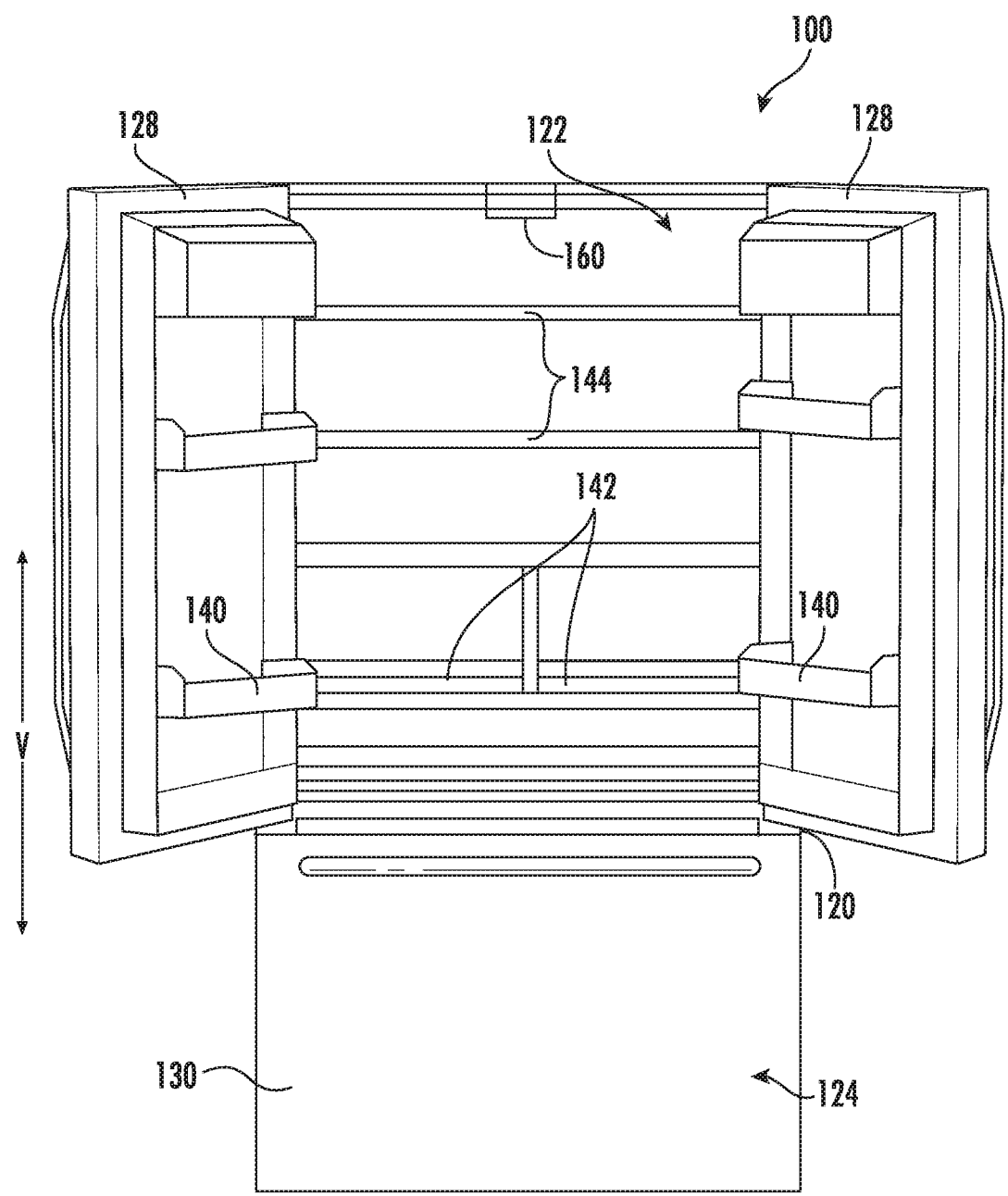
FIG. 2 provides a front elevation view of a refrigerator appliance according to exemplary embodiments of the present disclosure, wherein refrigerator doors are shown in an open position.

Turning now to the figures, FIG. 1 provides a front elevation view of a refrigerator appliance 100 according to exemplary embodiments of the present disclosure with refrigerator doors 128 of the refrigerator appliance 100 shown in a closed position. FIG. 2 provides a front view elevation of refrigerator appliance 100 with refrigerator doors 128 shown in an open position to reveal a fresh food chamber 122 of refrigerator appliance 100.

Refrigerator appliance 100 includes a housing or cabinet 120 that extends between a top 101 and a bottom 102 along a vertical direction V. Cabinet 120 defines chilled chambers for receipt of food items for storage. In particular, cabinet 120 defines fresh food chamber 122 positioned at or adjacent top 101 of cabinet 120 and a freezer chamber 124 arranged at or adjacent bottom 102 of cabinet 120. As such, refrigerator appliance 100 is generally referred to as a bottom mount refrigerator. It is recognized, however, that the benefits of the present disclosure apply to other types and styles of storage enclosure, such as a top mount refrigerator appliance, a side-by-side style refrigerator appliance, etc. Consequently, the description set forth herein is for illustrative purposes only and is not intended to be limiting in any aspect to any particular storage enclosure or refrigerator chamber configuration.

Refrigerator doors 128 are rotatably hinged to an edge of cabinet 120 for selectively accessing fresh food chamber 122. In addition, a freezer door 130 is arranged below refrigerator doors 128 for selectively accessing freezer chamber 124. Freezer door 130 is coupled to a freezer drawer 142 (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

In some embodiments, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of stored items (e.g., beverages or solid food items) and may assist with organizing such food items. As an example, drawers 142 can receive fresh food items (e.g., vegetables, fruits, or cheeses) and increase the useful life of such fresh food items.

In optional embodiments, refrigerator appliance 100 also includes features for assisting a user with identifying food items positioned within fresh food chamber 122 or freezer chamber 124. The user can use such features, for example, to view food items stored (i.e., stored items) within fresh food chamber 122 or freezer chamber 124 or create an inventory of such stored items.

Figure 3:
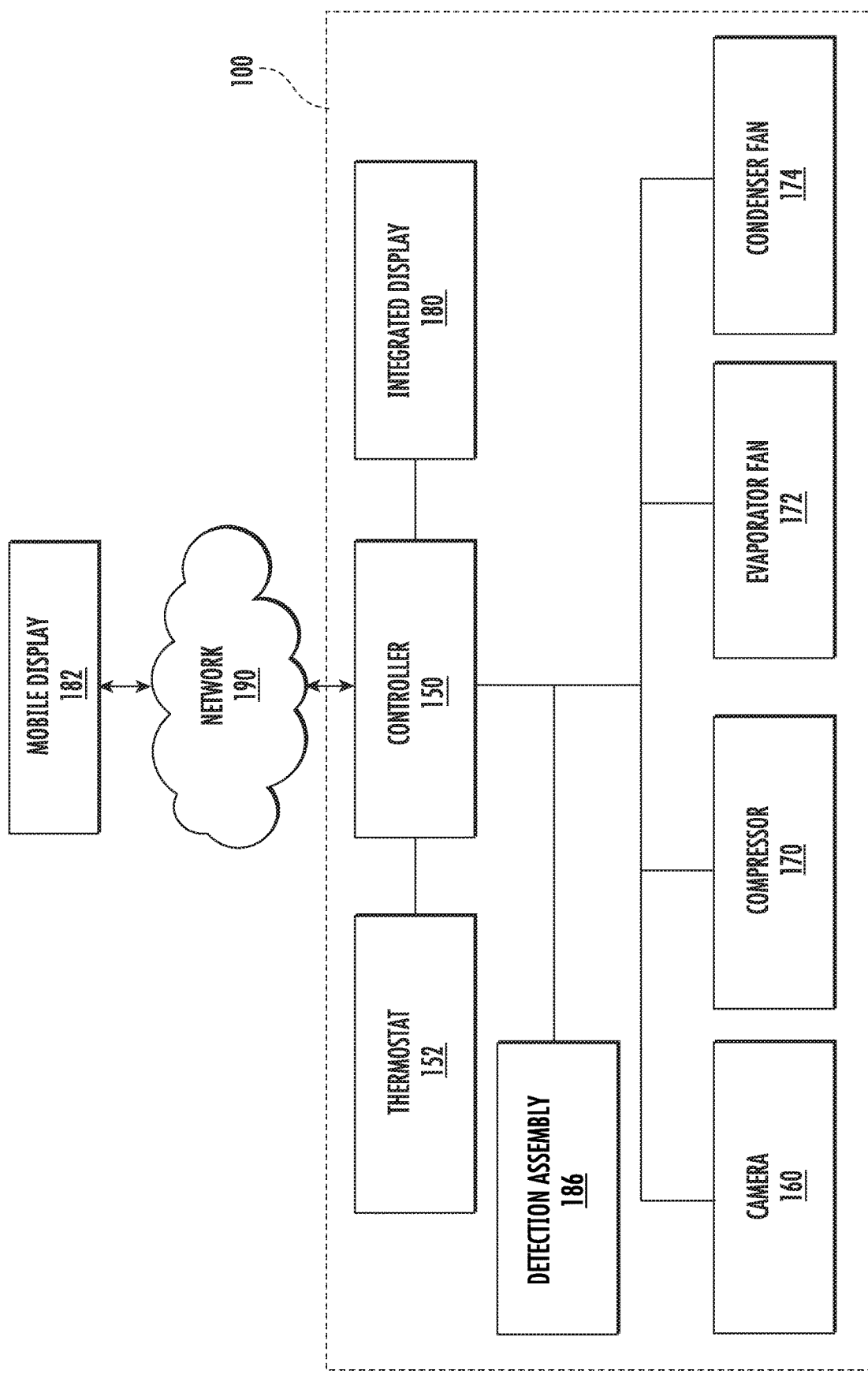
FIG. 3 provides a schematic view of a refrigerator appliance according to exemplary embodiments of the present disclosure.

Referring generally to FIGS. 1 through 3, FIG. 3 provides a schematic view of refrigerator appliance 100. Refrigerator appliance 100 includes a controller 150 that is operatively coupled to, or in communication with, components of a refrigeration system of refrigerator appliance 100 configured for cooling fresh food chamber 122 or freezer chamber 124. The components include a compressor 170, an evaporator fan 172, and a condenser fan 174. Controller 150 can selectively operate such components in order to cool fresh food chamber 122 or freezer chamber 124. Controller 150 is also in communication with a thermostat (e.g., a thermocouple or thermistor). The thermostat may be positioned in fresh food compartment 122 or freezer compartment 124. Controller 150 may receive a signal from the thermostat that corresponds to a temperature of fresh food compartment 122 or freezer compartment 124. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes non-transitory programming instructions stored in memory. For certain embodiments, the instructions include a software package configured to operate appliance 100 or execute an operation routine (e.g., the exemplary method 600 described below with reference to FIG. 6). The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in communication (e.g., electrical communication) with controller 150 via one or more conductive signal lines or shared communication busses. Additionally or alternatively, one or more components of refrigerator appliance 100 may be in communication (e.g., wireless communication) with controller 150 via one or more wireless signal bands.

In some embodiments, refrigerator appliance 100 also includes a camera or camera module 160. Camera 160 may be any type of device suitable for capturing a two-dimensional picture or image. As an example, camera 160 may be a video camera or a digital camera with an electronic image sensor [e.g., a charge coupled device (CCD) or a CMOS sensor]. When assembled, camera 160 is in communication (e.g., electric or wireless communication) with controller 150 such that controller 150 may receive a signal from camera 160 corresponding to the image captured by camera 160.

Generally, camera 160 is positioned on refrigerator appliance 100. In some embodiments, camera 160 is mounted within fresh food chamber 122 at a top portion thereof (e.g., proximal to top 101 and distal to bottom 102). For instance, camera 160 may be fixed to or directed through a top wall of an internal liner defining fresh food chamber 122. In such embodiments, camera 160 may be directed downward, as illustrated in FIG. 2.

In certain embodiments, camera 160 is directed toward one or more chilled chambers (e.g., fresh food chamber 122). For instance, camera 160 may be directed towards at least a portion of any particular one of or combination of drawers 142 and shelves 144. Thus, camera 160 can capture images of one of drawers 142, all of drawers 142, one of shelves 144, all of shelves 144, or any suitable combination thereof.

Figure 4:
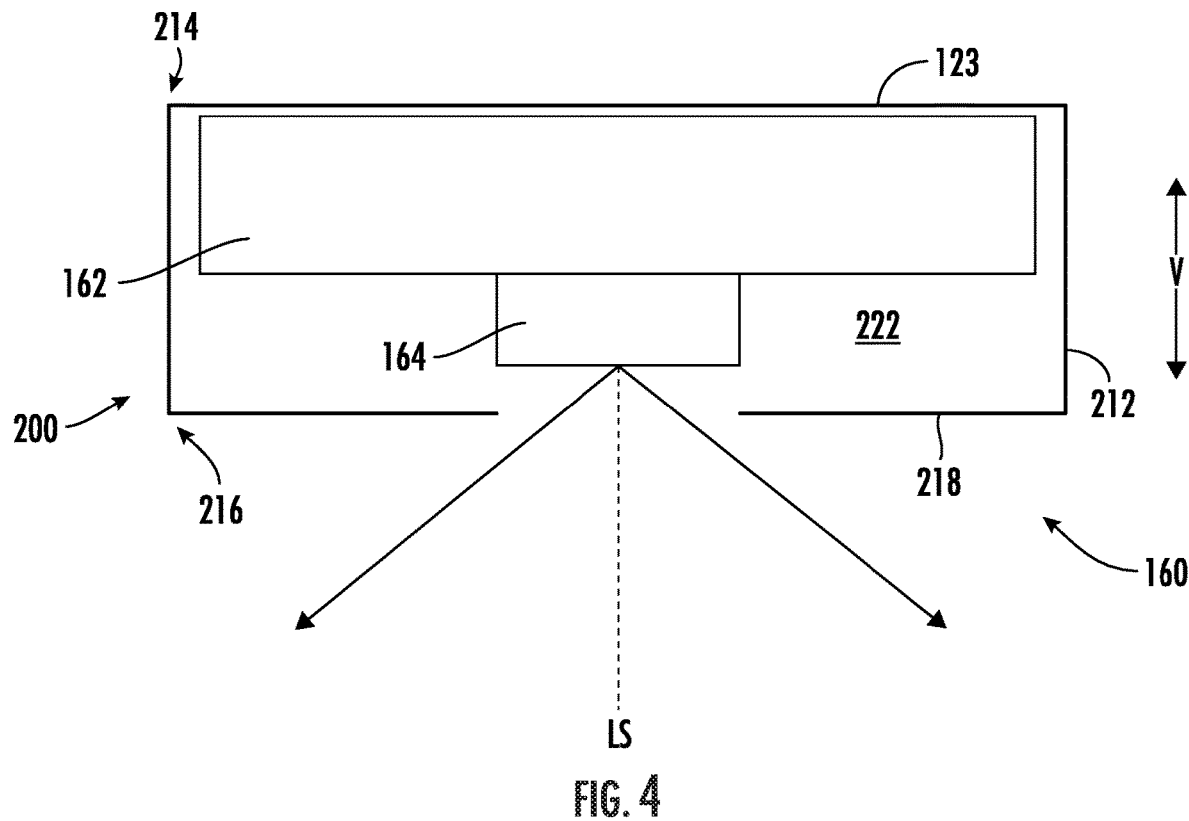
FIG. 4 provides a schematic sectional view of a camera module of a refrigerator appliance according to exemplary embodiments of the present disclosure.
Figure 5:
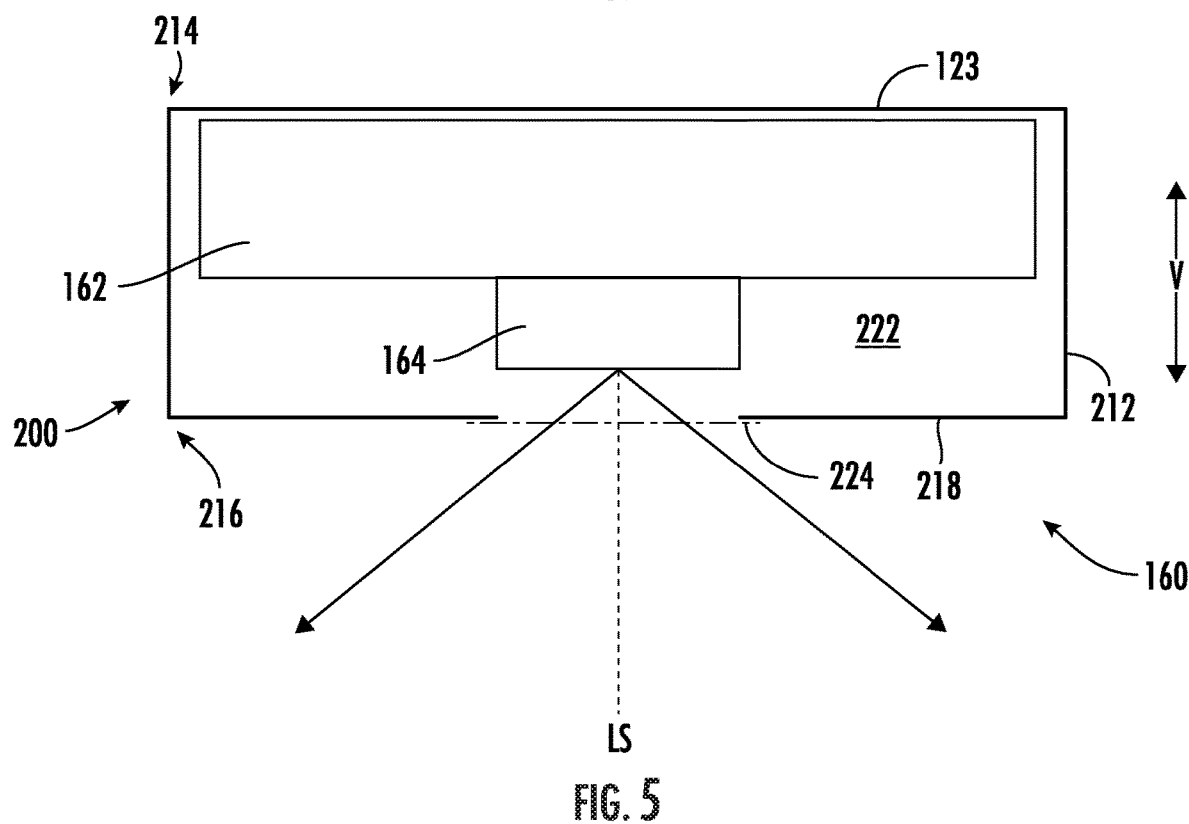
FIG. 5 provides a schematic sectional view of a camera module of a refrigerator appliance according to other exemplary embodiments of the present disclosure.

Turning briefly to FIGS. 4 and 5, in some embodiments, camera 160, including a circuit board 162 and a primary lens 164_ thereof, is received within in a camera enclosure 210_. As shown, camera enclosure 210 extends about at least a portion of camera 160 (e.g., on internal liner 123). For instance, an enclosure sidewall 212_ may extend from internal liner 123 and about camera 160 (e.g., such that camera is radially surrounded by enclosure sidewall 212_). Specifically, enclosure sidewall 212_ may extend from an top end 214_ to a bottom end 216_. If mounted at a top portion of internal liner 123, bottom end 216_ may be disposed below a bottommost surface of camera 160 (e.g., as defined at primary lens 164). From enclosure sidewall 212 (e.g., at bottom end 216_) a front wall 218 extends radially inward. Front wall 218_ may define an opening or aperture 220_ along or aligned with the line of sight LS of camera 160 such that the viewing angle of camera 160 generally unobstructed and camera 160 is able to gather images of fresh food chamber 122 through aperture 220_. Although FIG. 4 illustrates aperture 220_ as an open void, FIG. 5 illustrates that aperture 220 may be covered by a transparent secondary lens 224_ spaced apart from primary lens 164 to close or seal camera enclosure 210_, and thereby prevent or restricting fluid communication between camera 160 and the chilled chamber in which it is mounted (e.g., fresh food chamber 122).

As shown generally in FIGS. 4 and 5, front wall 218_ is spaced apart (e.g., vertically) from camera 160. When assembled, camera enclosure 210_ generally defines an open volume 222_about camera 160. Camera enclosure 210 may be formed from a solid, nonpermeable material, such as a suitable polymer or metal. As camera 160 generates heat (e.g., due part to circuit resistance as a current is conducted to/from camera 160) capturing an image, such heat may be held or trapped within open volume 222, advantageously preventing the accumulation of condensation on primary lens 164 or secondary lens 224_.

Returning generally to FIGS. 1 through 3, in certain embodiments, refrigerator appliance 100 includes an integrated display 180. Integrated display 180 may be mounted on refrigerator door 128 or at any other suitable location on refrigerator appliance 100. Integrated display 180 is in communication with controller 150 such that integrated display 180 may receive a signal from controller 150 corresponding to an image captured by camera 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image (e.g., a projector).

In additional or alternative embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In some such embodiments, refrigerator appliance 100 (e.g., controller 150) is in communication with a mobile display 182 via network 190. Mobile display 182 can be any device configured to communicate over network 190 and display images received therefrom. For example, mobile display 182 may be a computer, a smartphone, or a tablet. Mobile display 182 is in communication with controller 150 such that mobile display 182 may receive a signal from controller 150 (via network 190) corresponding to a user interface or an image captured by camera 160. Mobile display 182 can receive such signal from controller 150 and present one or more images to a user visually. Mobile display 182 may include, for example, a liquid crystal display panel (LCD), a plasma display panel (PDP), or any other suitable mechanism for displaying an image (e.g., a projector). Mobile display 182 can also include an interface (e.g., tactile inputs, such as buttons, or a graphical user interface) that allows mobile display 182 to initiate communications with refrigerator appliance 100 over network 190.

In certain embodiments, refrigerator appliance 100 includes a detection assembly 186 (e.g., to detect a user's presence). For instance, detection assembly 186 may include one or more sensors configured to directly detect a user's presence (e.g., by detecting a biometric or personalized marker corresponding to a specific individual user) or indirectly detecting a user's presence (e.g., by detecting movement of a door 128 or 130).

As an example, detection assembly 186 may include a forward-facing camera configured to recognize or identify a user's face based on a captured two-dimensional image.

As another example, detection assembly 186 may include a fingerprint imaging sensor configured to visually detect a user's fingerprint.

As yet another example, detection assembly 186 may include a signal-detection sensor configured to detect a device address over a wireless communications band (e.g., a BLE band using short-wavelength UHF radio waves in the ISM band from 2.4 to 2.485 GHz). The device address may be a programmed Bluetooth address of, for instance, mobile display 182. The detection assembly 186 may thus determine if and when a mobile display 182 is within close proximity to refrigerator appliance 100.

As still another example, detection assembly 186 may include a door switch (e.g., reed switch, pusher switch, Hall effect sensor, etc.) selectively engaged with a refrigerator door 128 to detect if/when the door 128 is in an open position. Such switches are generally understood and may, for instance, simultaneously control activation of a light for illuminating the fresh food chamber 122. Opening the refrigerator door 128 may thus activate the light and transmit a signal indicating detection of a user.

During use, such as during one or more image capture sequences, camera 160 may capture one or more two-dimensional images (e.g., as a video feed or series of sequential static images) that may be transmitted to the controller 150 (e.g., as a data signal). as is generally understood. With each image capture, a burst or pulse of heat may be generated by camera 160 from resistance of an electric current or voltage being transmitted through the various electrical components or circuits of the camera. Thus, the burst or pulses of heat may generally correspond to the sample or frame rate of a particular image capture sequence. The particular image capture sequence or further analysis of the received image signals at controller 150 may be varied or alternated (e.g., based on one or more conditions of the refrigerator appliance 100).

As an example of use, a continuous anti-fog capture sequence may direct camera 160 to collect and transmit images (e.g., sequentially at a set sample rate, as defined in frames per second), even while the door(s) 128 is/are closed or no user is otherwise present. Generally, such images will be static (e.g., objects within the field of view of camera 160 will be unmoved or light within fresh food chamber 122 will be insufficient to collect anything more than a blank image). Once captured, the blank or static images may be discarded (e.g., at controller 150).

As another example of use, an open-door capture sequence may direct camera 160 to collect and transmit images (e.g., sequentially at a set sample rate different from the sample rate of the continuous anti-fog capture sequence), while one or more of doors 128 are open or a user is otherwise present. Generally, such images will be occupied (e.g., with information or data values for objects or light within the field of view of camera 160). Once captured, the occupied images may be recorded (e.g., at least temporarily at controller 150), such that the occupied image may be transmitted for presentation (e.g., at integrated display 180 or remote display 182). Additionally or alternatively, from the recorded occupied images, items (e.g., stored items, such as food, or non-stored items such as a user appendage, a shelf, a movable drawer, etc.) within the field of view (e.g., set field of view) for the camera 160 may be automatically identified by the controller 150 (e.g., to catalog items within fresh food chamber 122). As is understood, recognizing or identifying such items, may be performed by edge matching, divide-and-conquer search, greyscale matching, histograms of receptive field responses, or another suitable routine (e.g., executed at the controller 150 based on one or more captured images from camera 160).

In some embodiments, camera 160 alternates between the continuous anti-fog capture sequence and the open-door capture sequence such that camera 160 remains active to generate heat at regular intervals (e.g., according to the sample rate of whichever image capture is being performed at a given moment). Advantageously, such heat generation may prevent condensation or fog from accumulating (e.g., at a lens or secondary lens 224_) within the line of sight LS of camera 160 and obfuscating images captured by camera 160. Optionally, the open-door capture sequence may be initiated (e.g., thereby stopping or interrupting the continuous anti-fog capture sequence) by a predetermined engagement action, such as opening a door 128, detected movement within a chilled chamber (e.g., fresh food chamber 122), a user engaging or moving within range of detection assembly 186, providing a user input at a user interface or integrated display 180, etc. Additionally or alternatively, an anti-fog capture sequence may be initiated (e.g., thereby stopping or interrupting the open-door capture sequence) by a separate predetermined action or the absence of the engagement action that initiated the open-door capture sequence.

In optional embodiments, camera 160 and controller 150 are configured to capture multiple (e.g., a pair of) sequential, two-dimensional images (e.g., at a set sample rate) as part of the anti-fog capture sequence. Generally, each two-dimensional image includes multiple pixels (e.g., arranged in a predefined grid), as is understood. Sequential images (e.g., a previously-captured image and a more-recently-captured image) of the same field of view or line of sight (e.g., the same region of the fresh food chamber 122) for the anti-fog capture sequence may be compared at the controller 150 prior to being discarded. For instance, the sequential images may be compared to each other or to a baseline value/value set (e.g., of pixel brightness or color). Changes in the sequential images or changes from the baseline value/value set may be detected to prompt a new image capture sequence.

Specifically, detected changes, such as an elevated image value, may prompt the controller 150 to alternate from a continuous anti-fog sequence to an open-door capture sequence. An elevated image value may be detected by any suitable comparison or pixel characteristic, such as brightness value or a color value that might indicate a change in a brightness value or a detection of movement (e.g., from corresponding pixels in the sequential two-dimensional images).

As would be understood, each pixel within a two-dimensional image or set field of view has a brightness range. Optionally, the brightness range may be an RGB brightness range between, for example, 0 and 255 (e.g., wherein "0" is a minimum RGB pixel-brightness value and "255" is a maximum RGB pixel-brightness value). In certain embodiments, the brightness value for multiple pixels may be detected for a measurement of brightness. For instance, a mean brightness (Bm) value of the pixel-brightness values may be calculated for a corresponding two-dimensional image (or sub-region thereof). Additionally or alternatively, a deviation value may be calculated (e.g., as the brightness value) for multiple pixels in comparison to a balanced value. For instance, the brightness value (Vbr) of a captured image may be calculated as the absolute value of the mean brightness value minus a balanced vale (e.g., 125) over the balanced value. In other words, in some embodiments, brightness value may be expressed as $Vbr = (|Bm - 125|)/125.$ In some embodiments, during an anti-fog capture sequence, an elevated brightness value may prompt an open-door capture sequence. For instance, the elevated brightness value may be an increase in brightness values between one or more pixels in a first captured image and one or more corresponding pixels in a second captured image. When the door 128 is closed, the brightness values of a corresponding captured image are relatively low. By contrast, when the door 128 is open, light from inside the fresh food chamber 122 may cause the brightness values of a corresponding captured image to be relatively high. Thus, a detected increase in brightness values (e.g., an increase of a set amount, relative percentage, etc.) may indicate the door 128 is open.

Figure 6:
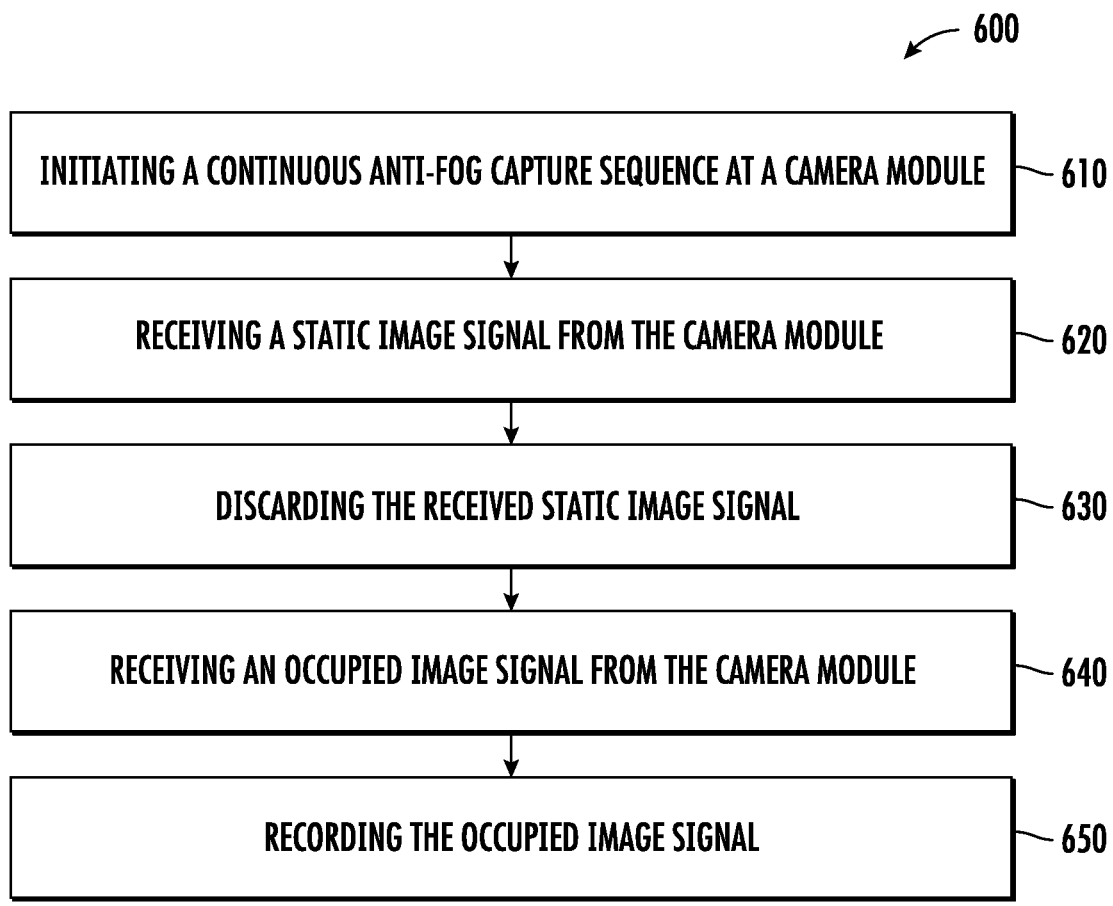
FIG. 6 provides a flow chart illustrating a method of operating a refrigerator appliance according to exemplary embodiments of the present disclosure.

Turning now to FIG. 6, a flow chart is provided of a method 600 according to exemplary embodiments of the present disclosure. Generally, the method 600 provides a method of operating a refrigerator appliance 100 (FIG. 1) that includes a camera 160, as described above. The method 600 can be performed, for instance, by the controller 150 (FIG. 3). For example, controller 150 may, as discussed, be in communication with camera 160 or detection assembly 186 (FIG. 3). During operations, controller 150 may send signals to and receive signals from camera 160 or detection assembly 186. Controller 150 may further be in communication with other suitable components of the appliance 100 to facilitate operation of the appliance 100 generally.

Advantageously, methods in accordance with the present disclosure may efficiently prevent condensation within a portion of a chilled chamber (e.g., without requiring or using a dedicated heater or heating element). For instance, the disclosed methods may permit a camera's own heat generation to constantly prevent the accumulation of condensation (e.g., on a lens of camera) as the refrigerator appliance is operated. Additionally or alternatively, the present methods may facilitate the efficient and effective management of captured images (e.g., such that a controller is not overwhelmed by stored or received data).

FIG. 6 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure (except as otherwise described or required).

At 610, the method 600 includes initiating a continuous anti-fog capture sequence at the camera or camera module mounted within the chilled chamber (e.g., fresh food chamber) of the refrigerator appliance. Generally, the continuous anti-fog capture sequence may direct images to be captured sequentially at the camera module. For instance, two-dimensional images may be captured at a set sample rate. The sample rate of the anti-fog capture sequence may be relatively low, such as between 1 frame per second and 25 frames per second. Additionally or alternatively, the sample rate of the anti-fog capture sequence may be around 10 frames per second.

Initiation of the anti-fog capture sequence may correspond to operation or activation of the refrigerator appliance, generally. Thus, as the refrigerator directs operations of one or more features, a capture sequence may be directed at the camera. Specifically, the refrigerator appliance may direct multiple discrete capture sequences at the camera. For instance, the refrigerator appliance may alternate between at least two capture sequences, such as a continuous anti-fog capture sequence and an open-door capture sequence. Optionally, the continuous anti-fog capture sequence may be initiated as (e.g., in response to) another capture sequence (e.g., an open-door capture sequence) ending, and vice versa.

At 620, the method 600 includes receiving a static image signal from the camera module during the continuous anti-fog capture sequence. As described above, images captured at the camera may be transmitted to (and received by) the controller of refrigerator appliance (e.g., as such images are captured). The static image signal may thus correspond to an image captured at the camera module as part of the continuous anti-fog capture sequence.

At 630, the method 600 includes discarding the received static image signal. Generally, the continuous anti-fog capture sequence may capture images of the chilled chamber when little or no information is expected to be discernable. Thus, such images (as provided with an image signal) may be deleted or discarded from the controller. Optionally, the static image signal may be discarded immediately upon receipt at the controller. Alternatively, the static image signal may be discarded following (e.g., in response to) an ephemeral evaluation, such as to detect an elevated pixel value or compare a pair of sequential image signals.

At 640, the method 600 includes receiving an occupied image signal from the camera module during an open-door capture sequence. In certain embodiments, the refrigerator appliance can alternate between at least two capture sequences. Thus, the method 600 may include alternating from the continuous anti-fog capture sequence to the open-door capture sequence at the camera module. During the open-door capture sequence, images captured at the camera module may be transmitted to (and received by) the controller of refrigerator appliance (e.g., as such images are captured). The occupied image signal at 640 may thus correspond to an image captured at the camera module as part of the open-door capture sequence.

Generally, the open-door capture sequence may direct images to be captured sequentially at the camera module. For instance, two-dimensional images may be captured at a set sample rate that is greater than the sample rate of the anti-fog capture sequence. The sample rate of the open-door capture sequence may thus be relatively high, such as between 25 frames per second and 120 frames per second. Additionally or alternatively, the sample rate may be greater than or equal to 30 frames per second. Further additionally or alternatively, the sample rate may be around 60 frames per second.

In some embodiments, alternating to the open-door capture is prompted by a signal received or detection made during the continuous anti-fog capture sequence.

As an example, the controller may receive an open signal from a door switch in selective communication with a door of the refrigerator appliance, as described above. In response to receiving the open signal, 640 and the open-door capture sequence, generally, may be prompted.

As an additional or alternative example, the controller may detect an elevated image value from the received static image signal of 620 (e.g., prior to 630). The elevated image value may be of a brightness or color value of a pixel or set of pixels in the static image of the continuous anti-fog capture sequence, as described above. In particular, the elevated image value may an image value that is determined to exceed a baseline image value or value set. In response to receiving or detecting the elevated image value, 640 and the open-door capture sequence, generally, may be prompted. In some such embodiments, 630 is initiated with or immediately prior to alternating to the open-door capture sequence.

As another additional or alternative example, the controller may receive a pair of sequential image signals from the continuous anti-fog capture sequence. Between the pair of sequential image signals, a change (e.g., in brightness value or movement) may be detected, as described above. Moreover, in response to detecting the change between the pair of sequential image signals, 640 and the open-door capture sequence, generally, may be prompted. In some such embodiments, 630 is initiated with or immediately prior to alternating to the open-door capture sequence.

At 650, the method 600 includes recording the occupied image signal (e.g., at least temporarily) at the controller. Once recorded, the occupied image signal may be further analyzed. As an example, the occupied image signal may be transmitted to or rendered at a display. Thus, the two-dimensional image corresponding to the occupied image signal may be presented at a suitable connected display, such as an integrated display or a remote display, as described above. As an additional or alternative, example, the two-dimensional image corresponding to the occupied image signal may be further evaluated according to an image recognition routine, as further described above (e.g., to identify or catalog items stored within the refrigerator appliance).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigerator appliance comprising a camera module mounted within a chilled chamber, the method comprising:
   initiating a continuous anti-fog capture sequence at the camera module;
   receiving a static image signal from the camera module during the continuous anti-fog capture sequence;
   discarding the received static image signal;
   alternating to an open-door capture sequence from the continuous anti-fog capture sequence at the camera module; and
   recording an image signal from the camera module during the open-door capture sequence,
   wherein the open-door capture sequence has a sample rate greater than a sample rate of the anti-fog capture sequence.

2. The method of claim 1, wherein the sample rate of the anti-fog capture sequence is between 1 and 25 frames per second.

3. The method of claim 1, wherein the sample rate of the open-door capture is greater than or equal to 30 frames per second.

4. The method of claim 1, further comprising:
   receiving an open signal from a door switch in selective communication with a door of the refrigerator appliance, wherein alternating to the open-door capture sequence is in response to receiving the open signal.

5. The method of claim 1, further comprising:
   detecting an elevated image value in the received static image signal,
   wherein alternating to the open-door capture sequence is in response to detecting the elevated image value in the received static image signal during the continuous anti-fog capture sequence.

6. The method of claim 1, further comprising:
   receiving a pair of sequential image signals from the camera module during the continuous anti-fog capture sequence; and
   detecting a change in pixels between the pair of sequential image signals,
   wherein alternating to the open-door capture sequence is in response to detecting the change in pixels between the pair of sequential image signals during the continuous anti-fog capture sequence.

7. The method of claim 1, wherein the camera module is received within a camera enclosure comprising a front wall defining an aperture along a line of sight of the camera module, and wherein the front wall is spaced apart from the camera module.

8. A method of operating a refrigerator appliance comprising a camera module mounted within a chilled chamber, the method comprising:
   initiating a continuous anti-fog capture sequence at the camera module;
   receiving a static image signal from the camera module during the continuous anti-fog capture sequence;
   discarding the received static image signal;
   alternating to an open-door capture sequence from the continuous anti-fog capture sequence at the camera module;
   recording an image signal from the camera module during the open-door capture sequence; and
   detecting an elevated image value in the received static image signal,
   wherein alternating to the open-door capture sequence is in response to detecting the elevated image value in the received static image signal during the continuous anti-fog capture sequence.

9. The method of claim 8, wherein the anti-fog capture sequence has a sample rate of between 1 and 25 frames per second.

10. The method of claim 8, wherein a sample rate of the open-door capture is greater than or equal to 30 frames per second.

11. The method of claim 8, further comprising:
    receiving an open signal from a door switch in selective communication with a door of the refrigerator appliance, wherein alternating to the open-door capture sequence is in response to receiving the open signal.

12. The method of claim 8, further comprising:
    receiving a pair of sequential image signals from the camera module during the continuous anti-fog capture sequence; and
    detecting a change in pixels between the pair of sequential image signals,
    wherein alternating to the open-door capture sequence is in response to detecting the change in pixels between the pair of sequential image signals during the continuous anti-fog capture sequence.

13. The method of claim 8, wherein the camera module is received within a camera enclosure comprising a front wall defining an aperture along a line of sight of the camera module, and wherein the front wall is spaced apart from the camera module.

14. A method of operating a refrigerator appliance comprising a camera module mounted within a chilled chamber, the method comprising:
    initiating a continuous anti-fog capture sequence at the camera module;
    receiving a static image signal from the camera module during the continuous anti-fog capture sequence;
    discarding the received static image signal;
    alternating to an open-door capture sequence from the continuous anti-fog capture sequence at the camera module; and
    recording an image signal from the camera module during the open-door capture sequence;
    receiving a pair of sequential image signals from the camera module during the continuous anti-fog capture sequence; and
    detecting a change in pixels between the pair of sequential image signals,
    wherein alternating to the open-door capture sequence is in response to detecting the change in pixels between the pair of sequential image signals during the continuous anti-fog capture sequence.

15. The method of claim 14, wherein the anti-fog capture sequence has a sample rate of between 1 and 25 frames per second.

16. The method of claim 15, wherein a sample rate of the open-door capture is greater than or equal to 30 frames per second.

17. The method of claim 14, further comprising:
    receiving an open signal from a door switch in selective communication with a door of the refrigerator appliance, wherein alternating to the open-door capture sequence is in response to receiving the open signal.

18. The method of claim 14, wherein the camera module is received within a camera enclosure comprising a front wall defining an aperture along a line of sight of the camera module, and wherein the front wall is spaced apart from the camera module.

* * * * *